(12) United States Patent
Sasaki et al.

(10) Patent No.: US 12,043,245 B2
(45) Date of Patent: Jul. 23, 2024

(54) VEHICLE CONTROL DEVICES, VEHICLE CONTROL SYSTEMS, AND HYBRID VEHICLES

(71) Applicant: TOYOTA JIDOSHA KABUSHIKI KAISHA, Aichi-ken (JP)

(72) Inventors: Hirotaka Sasaki, Nagoya (JP); Kunihiko Jinno, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 351 days.

(21) Appl. No.: 17/529,125

(22) Filed: Nov. 17, 2021

(65) Prior Publication Data

US 2022/0219668 A1 Jul. 14, 2022

(30) Foreign Application Priority Data

Jan. 8, 2021 (JP) ................. 2021-002211

(51) Int. Cl.
*B60W 20/00* (2016.01)
*B60L 50/61* (2019.01)
(Continued)

(52) U.S. Cl.
CPC ............. *B60W 20/12* (2016.01); *B60L 50/61* (2019.02); *B60W 20/13* (2016.01); *H02J 7/16* (2013.01);
(Continued)

(58) Field of Classification Search
CPC ................. B60W 20/12; B60W 20/13; B60W 2510/244; B60W 2520/04;
(Continued)

(56) References Cited

U.S. PATENT DOCUMENTS

2017/0120888 A1\* 5/2017 Jinno ............... B60W 50/0097
2018/0208075 A1\* 7/2018 Nozaki ................ B60L 58/40
(Continued)

FOREIGN PATENT DOCUMENTS

| JP | 2012153257 A | 8/2012 | |
| JP | 201781416 A | 5/2017 | |
| JP | 2017081416 A | * 5/2017 | ............. B60L 53/00 |

OTHER PUBLICATIONS

Jinno et al., "Hybrid Vehicle's Real World Fuel Economy Development by Machine Learning of Behavior Pattern", Transactions of the Society of Automotive Engineers of Japan, vol. 49, No. 2, Mar. 27, 2018. pp.307-310, 4pp.

*Primary Examiner* — Tiffany P Young
(74) *Attorney, Agent, or Firm* — HAUPTMAN HAM, LLP

(57) ABSTRACT

A control device for a hybrid vehicle includes: a prediction unit that acquires position information of a parking point where parking time of the hybrid vehicle on a travel route is predicted to exceed a threshold value; and a target setting unit that sets a target charge rate of the battery and changes the target chare rate to a second charge rate that is lower than a first charge rate in a normal state when the hybrid vehicle satisfies an approach condition of approaching the parking point. A charge and discharge amount is controlled such that a charge and discharge amount of the battery corresponding to the second charge rate when the target setting unit sets the target charge rate to the second charge rate is larger to a discharge side than a charge and discharge amount of the battery corresponding to the second charge rate in the normal state.

12 Claims, 10 Drawing Sheets

(51) Int. Cl.
  *B60W 20/12* (2016.01)
  *B60W 20/13* (2016.01)
  *H02J 7/16* (2006.01)

(52) U.S. Cl.
  CPC ... *B60W 2510/244* (2013.01); *B60W 2520/04* (2013.01); *B60W 2520/10* (2013.01); *B60W 2520/12* (2013.01); *B60W 2540/30* (2013.01)

(58) Field of Classification Search
  CPC ......... B60W 2520/10; B60W 2520/12; B60W 2540/30; B60L 50/61; H02J 7/16
  USPC .......................................................... 701/22
  See application file for complete search history.

(56) References Cited

U.S. PATENT DOCUMENTS

2019/0329758 A1* 10/2019 Takahashi ............. B60W 20/13
2020/0317187 A1* 10/2020 Assaliyski ............ B60W 20/13

\* cited by examiner

VEHICLE CONTROL DEVICES, VEHICLE CONTROL SYSTEMS, AND HYBRID VEHICLES

CROSS-REFERENCE TO RELATED APPLICATION

This application claims priority to Japanese Patent Application No. 2021-002211 filed on Jan. 8, 2021, incorporated herein by reference in its entirety.

BACKGROUND

1. Technical Field

The present disclosure relates to a vehicle control device, a vehicle control system, and a hybrid vehicle.

2. Description of Related Art

In a hybrid vehicle in which a battery can be charged with electromotive force generated by an engine, it is known a vehicle control device configured to, when it is determined that the vehicle is moving to a parking point where parking time is expected to be longer than predetermined time while driving by the engine, reduce a target charge rate of the battery and cause the vehicle to travel by electric power from a point preceding the parking point by a predetermined distance to reduce charge amount of the battery (for example, see Japanese Unexamined Patent Application Publication No. 2017-081416 (JP 2017-081416 A)).

SUMMARY

However, even when the hybrid vehicle travels by electric power from a point preceding a parking point, a battery charge rate may not be efficiently reduced to a target charge rate when the vehicle reaches the parking point depending on a travel state from the point preceding the parking point to the parking point.

According to aspects of the present disclosure, a vehicle control device, a vehicle control system, and a hybrid vehicle are provided. In the vehicle control device and the vehicle control system, the battery charge rate can be efficiently reduced to the target charge rate when the hybrid vehicle reaches the parking point.

An first aspect of the present disclosure relate to a vehicle control device configured to be mounted on a hybrid vehicle that is able to charge a battery with electric power generated by driving an engine. The vehicle control device includes a prediction unit configured to acquire position information of a parking point where parking time of the hybrid vehicle on a travel route is predicted to exceed a predetermined threshold value, a target setting unit configured to set a target charge rate of the battery and change the target charge rate to a second charge rate that is lower than a first charge rate in a normal state when the hybrid vehicle satisfies an approach condition that the hybrid vehicle approaches the parking point, and a battery control unit configured to control a charge and discharge amount of the battery such that a charge and discharge amount of the battery corresponding to the second charge rate when the target setting unit sets the target charge rate to the second charge rate is larger to a discharge side than a charge and discharge amount of the battery corresponding to the second charge rate in the normal state.

With the vehicle control device according to a first aspect, the charge and discharge amount of the battery corresponding to the second charge rate when the target setting unit sets the target charge rate to the second charge rate is larger to the discharge side than the charge and discharge amount of the battery corresponding to the second charge rate in the normal state. That is, electric energy (electric power) of the battery is consumed more actively. Therefore, when the hybrid vehicle reaches the parking point, the charge rate of the battery can be efficiently reduced to the target charge rate.

Further, the charge and discharge amount of the battery corresponding to the second charge rate when the target setting unit sets the target charge rate to the second charge rate may be set to an upper limit value of the charge and discharge amount of the battery corresponding to the second charge rate in the normal state.

With this configuration, the charge and discharge amount of the battery corresponding to the second charge rate when the target setting unit sets the target charge rate to the second charge rate is set to the upper limit value of the charge and discharge amount of the battery corresponding to the second charge rate in the normal state. Therefore, the electric energy of the battery is surely consumed. The "upper limit value" in the present disclosure includes a value that is equal to or less than the upper limit value and close to the upper limit value.

The upper limit value and a lower limit value of the charge and discharge amount of the battery in the normal state may be determined based on a charge capacity of the battery, a vehicle speed, and a driving characteristic.

With this configuration, the upper limit value and the lower limit value of the charge and discharge amount of the battery in the normal state are determined based on the charge capacity of the battery, the vehicle speed, and the driving characteristic. That is, in the normal state, the charge and discharge amount is controlled based on a traveling state (vehicle speed) and the driving characteristics of the hybrid vehicle. Therefore, even when the target setting unit sets the target charge rate to the second charge rate, the electric energy of the battery is consumed without deteriorating the battery.

Further, the approach condition may include a distance correction value set based on past data.

With this configuration, the approach condition includes the distance correction value set based on the past data. Therefore, when the hybrid vehicle reaches the parking point, the charge rate of the battery can be reduced more efficiently to the target charge rate than when the approach condition does not include the distance correction value.

Further, a charge and discharge amount correction value set based on the past data may be added to the charge and discharge amount of the battery corresponding to the second charge rate when the target setting unit sets the target charge rate to the second charge rate.

With this configuration, the charge and discharge amount correction value set based on the past data is added to the charge and discharge amount of the battery corresponding to the second charge rate when the target setting unit sets the target charge rate to the second charge rate. Therefore, when the hybrid vehicle reaches the parking point, the charge rate of the battery can be reduced more efficiently to the target charge rate than when the charge and discharge amount correction value is not added to the charge and discharge amount of the battery.

A second aspect of the present disclosure relates to a vehicle control system including the vehicle control device according to the first aspect, the vehicle control device being mounted on a hybrid vehicle, and an acquisition unit configured to be able to communicate with the vehicle control device and to acquire external information at the parking point.

With the vehicle control system according to the second aspect, the acquisition unit acquires the external information at the parking point. Therefore, when the hybrid vehicle reaches the parking point, the acquisition unit can efficiently reduce the battery charge rate of the battery to the target charge rate as compared with a case where the external information at the parking point is not acquired.

Further, a third aspect of the present disclosure relates to a hybrid vehicle including an engine, a battery that is able to be charged with electric power generated by driving the engine, a traction motor that is driven by the electric power charged in the battery, and the vehicle control device according to the first aspect. The vehicle control device is configured to cause the hybrid vehicle to travel by switching between driving by the engine and driving by the traction motor.

With the hybrid vehicle according to the third aspect, when the hybrid vehicle reaches the parking point, the charge rate of the battery can be efficiently reduced to the target charge rate as compared with a case where the vehicle control device is not provided.

As described above, according to the aspects of the present disclosure, when the hybrid vehicle reaches the parking point, the charge rate of the battery can be efficiently reduced to the target charge rate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments according to the present disclosure will be described in detail with reference to the drawings.

First Embodiment

Figure 1:
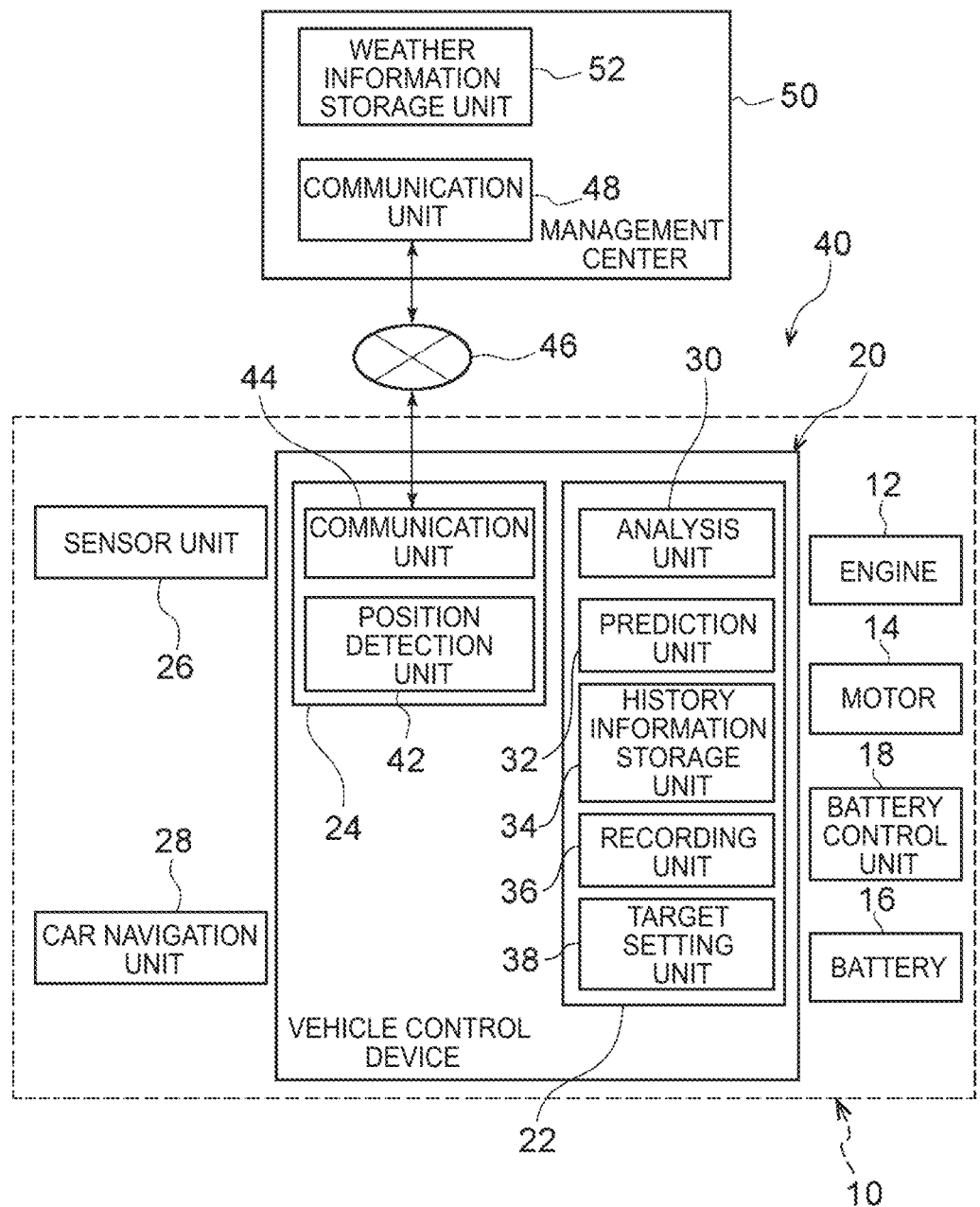
FIG. 1 is a block diagram showing a vehicle control device and a vehicle control system according to an embodiment.

First, a first embodiment will be described. As shown in FIG. 1, a hybrid vehicle 10 is provided with an engine 12, a battery (lithium ion secondary battery (storage battery)) 16 capable of charging electric power (electric energy) generated by driving the engine 12, a traction motor 14 that is driven by electric power charged in the battery 16, a battery control unit 18 that controls a state of charge (hereinafter may be referred to as "SOC") of the battery 16 by controlling the engine 12 and the traction motor 14, and a vehicle control device 20 that is an electronic device.

That is, the hybrid vehicle 10 is configured to be able to travel while appropriately switching between two types of driving forces generated by the engine 12 and the motor 14. Then, as described above, the engine 12 is driven not only for traveling but also for charging the battery 16. The battery 16 can also be charged by regenerating the motor 14.

The vehicle control device 20 includes a first control device 22 including an analysis unit 30, a prediction unit 32, a history information storage unit 34, a recording unit 36, and a target setting unit 38, and a second control device 24 including a position detection unit 42 and a communication unit 44. These are composed of an electronic control unit (ECU) and a software program executed on the ECU. The vehicle control device 20 is electrically connected to a sensor unit 26, a car navigation system 28, the engine 12, the motor 14, the battery 16, and the battery control unit 18.

The sensor unit 26 is configured to collect at least information on an external environment and a traveling locus (including a vehicle speed and a steering angle) of the hybrid vehicle 10. The sensor unit 26 may include a steering angle sensor, a yaw rate sensor, a wheel pulse sensor, a radar, a direction indicator, and the like.

The analysis unit 30 is configured to acquire and process sensed information (hereinafter may be referred to as "primary information") such as a current position, stop time, start time, a vehicle speed, etc. of the hybrid vehicle 10, generate travel history information (hereinafter may be referred to as "secondary information"), and record the travel history information in the history information storage unit 34. The stop time is time when the engine 12 is instructed to stop, and the start time is time when the engine 12 is instructed to start.

Further, the travel history information (secondary information) includes information on parking of the hybrid vehicle 10, that is, information indicating parking date and time (time zone and day of a week), parking time, and a parking point (destination). Then, the analysis unit 30 is configured to predict one or more parking points (destinations) of the hybrid vehicle 10 based on the travel history information (secondary information) stored in the history information storage unit 34 and weather information stored in a weather information storage unit 52 to be described later.

The prediction unit 32 is configured to predict a travel route of the hybrid vehicle 10 based on information such as the vehicle speed and the steering angle collected in the sensor unit 26 and route setting information in the car navigation system 28. Then, the prediction unit 32 is configured to acquire position information of a parking point (destination) where the parking time is expected to exceed a predetermined threshold value on the travel route of the hybrid vehicle 10 from among the one or more parking points (destinations) predicted by the analysis unit 30, and set a point preceding the position by a predetermined distance α.

The history information storage unit 34 is configured to store the travel history information (secondary information) of the hybrid vehicle 10 based on vehicle identification (ID) of the hybrid vehicle 10. The recording unit 36 is configured to record the primary information as appropriate. The target setting unit 38 is configured to set a target charge rate.

Here, a large change in the SOC in the battery 16 deteriorates the battery 16. Therefore, an upper limit value CU and a lower limit value CD are set for the SOC (see FIG. 2). That is, the battery 16 is controlled by the battery control unit 18 such that the SOC of the battery 16 falls within a range (allowable range) from the upper limit value CU to the lower limit value CD.

The position detection unit 42 is configured to acquire the current position (position information) of the hybrid vehicle 10 from the sensor unit 26 and the car navigation system 28. The communication unit 44 periodically transmits information including the vehicle identification (ID) of the hybrid vehicle 10 to a management center 50 to be described later. The vehicle ID may be any information that can uniquely identify the hybrid vehicle 10.

Further, a vehicle control system 40 is constructed by electrically connecting the vehicle control device 20 and the management center 50 via a communication network 46. That is, each component of the vehicle control system 40 is realized by any combination of hardware and software based on a central processing unit (CPU) and a memory of any computer, a program loaded to the memory, a storage unit such as a hard disk for storing the program, and an interface for network connection.

The management center 50 is a server that communicates (transmits and receives information) with the vehicle control device 20, and includes the weather information storage unit 52 as an acquisition unit and the communication unit 48. The weather information storage unit 52 is configured to acquire weather information from the Japan Meteorological Agency as external information, and store the weather information indicating an expected temperature and the like of each location. The communication unit 48 is configured to periodically receive information from the vehicle control device 20, and transmit the weather information stored in the weather information storage unit 52 to the vehicle control device 20.

The hybrid vehicle 10 provided with the vehicle control device 20 described above actively drives the engine 12 for warming up the engine 12 at the time of starting the hybrid vehicle 10. Traveling by the driving force generated by the engine, which also serves as warming up the engine as described above, is called "the engine running cold". When the engine 12 is sufficiently warmed up (a period in which the engine runs cold is completed), the hybrid vehicle 10 travels while taking a balance between driving forces generated by the engine 12 and the motor 14.

Further, in the hybrid vehicle 10, the battery 16 is also charged simultaneously by rotating a power generation motor (not shown) with a part of the driving force of the engine 12 while the engine is running cold. Charging the battery 16 using the driving force of the engine 12 when the engine runs cold is called "charging in a cold state", and a method for charging in a cold state will be described next.

Figure 2:
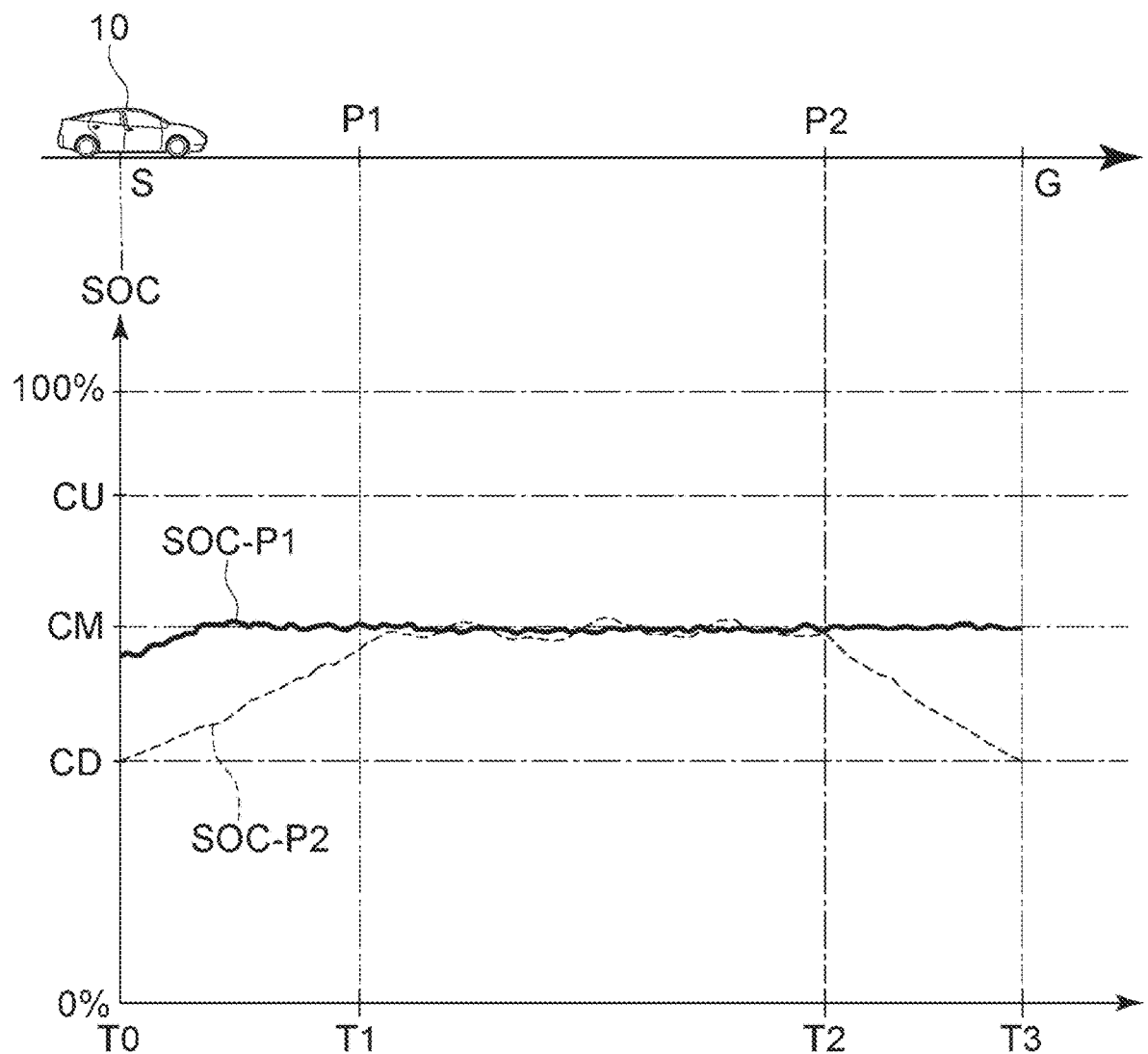
FIG. 2 is a schematic diagram illustrating a method for charging in a cold state according to the embodiment.

As shown in FIG. 2, it is assumed that the hybrid vehicle 10 departs from a point S at time T0, reaches a point P1 at time T1, reaches a point P2 at time T2, and reaches a point G at time T3, for example. The point S is a starting point and the point G is a destination. Further, a section from the point S to the point P1 is defined as a section in which the engine runs cold (hereinafter referred to as a "cold section").

The upper part of FIG. 2 shows a travel route of the hybrid vehicle 10, and the lower part of FIG. 2 shows a change in a SOC of the battery 16. The SOC has a minimum value of 0% and a maximum value of 100%. The allowable range is set for the SOC. The allowable range is defined by the lower limit value CD and the upper limit value CU. For example, the lower limit value CD of the SOC is assumed to be about 40%, and the upper limit value CU of the SOC is assumed to be about 80%.

The target charge rate is set to, for example, about 65%. In the following, a first charge rate that is the target charge rate in the normal state is referred to as "basic target charge rate CM". Therefore, the basic target charge rate CM in the embodiment is 65%. Based on the above, the method for charging in a cold state when the target charge rate is fixed to the basic target charge rate CM and a method for charging in a cold state when the target charge rate is variable will be described.

First, a case where the target charge rate is fixed to the basic target charge rate CM will be described. The target charge rate is fixed to the basic target charge rate CM between the lower limit value CD of the SOC and the upper limit value CU of the SOC. SOC-P1 shown in FIG. 2 shows a change in a charge/discharge amount when the target charge rate is the basic target charge rate CM. The charge/discharge amount for SOC-P1 shown in FIG. 2 is controlled to be maintained to the vicinity of the basic target charge rate CM.

As shown in FIG. 2, when the hybrid vehicle 10 starts at the point S, the hybrid vehicle 10 runs cold for a while, that is, the hybrid vehicle 10 runs with the driving force of the engine 12. At this time, the engine 12 also rotates the power generation motor. Since the power generation motor functions as a generator, charging in a cold state can be performed.

Here, when the actual SOC is lower than the basic target charge rate CM that is the target charge rate, charging in a cold state is performed. However, in this case, since the SOC-P1 of the hybrid vehicle 10 at time T0 is close to the basic target charge rate CM, there is little effect of charging in a cold state. That is, when the hybrid vehicle 10 starts to run cold, there is little room for charging in a cold state since the actual SOC is already sufficiently large.

Next, a case where the target charge rate is variable will be described. When the target charge rate is variable, the target charge rate is also set to the basic target charge rate CM between the lower limit value CD of the SOC and the upper limit value CU of the SOC at the point S. This is the same as the case where the target charge rate is fixed to the basic target charge rate CM. However, the actual SOC in this case is reduced to the vicinity of the lower limit value CD. SOC-P2 shown in FIG. 2 shows a change in a charge/discharge amount at this time. The charge/discharge amount for SOC-P2 shown in FIG. 2 is also controlled to be maintained to the vicinity of the basic target charge rate CM.

As shown in FIG. 2, when the hybrid vehicle 10 starts at the point S, the SOC-P2 increases, due to charging in a cold state, until SOC-P2 reaches the basic target charge rate CM. That is, since the actual SOC at the time of starting the hybrid vehicle 10 is sufficiently lower than the basic target charge rate CM, there is a large effect of charging in a cold state (charging in a cold state is performed efficiently).

Figure 3:
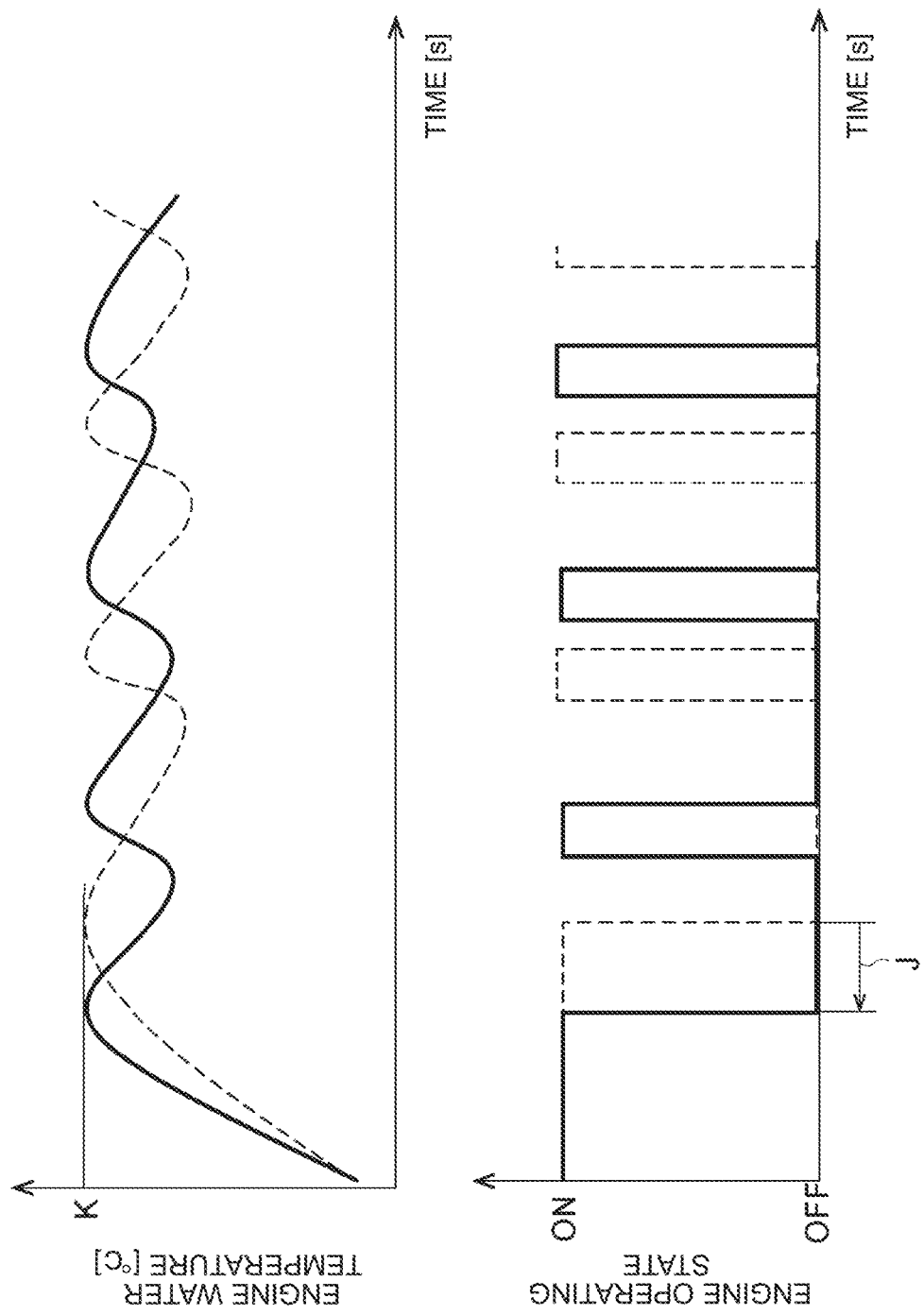
FIG. 3 is a graph showing a relationship between an engine water temperature and an engine speed during warm-up operation of an engine when a state of charge (SOC) is high and low in the hybrid vehicle according to the embodiment.

Further, since the engine 12 can be loaded by charging in a cold state, as shown in FIG. 3, there is a secondary effect in which the warming up of the engine 12 is promoted. That is, when the actual SOC at the time of starting the hybrid vehicle 10 is, for example, less than 50%, it is possible for the engine water temperature to reach a target temperature K (° C.) in a predetermined time J (for example, J is equal to several hundred seconds) or earlier than when the actual SOC at the time of starting the hybrid vehicle 10 is, for example, 50% or more, so that the cold section can be shortened (the engine 12 can be stopped early).

As described above, in order to enhance the effect of charging in a cold state (improve the utilization efficiency of charging in a cold state), the actual SOC needs to be sufficiently lowered when the hybrid vehicle 10 starts to run cold. Specifically, the actual SOC needs to be lowered compared with at least the target charge rate (basic target charge rate CM). Therefore, when the hybrid vehicle 10 restarts from the point G, it is desirable that the target charge rate be reduced to a second charge rate (hereinafter referred to as "special target charge rate") that is the vicinity of the lower limit value CD (a charge/discharge amount is equal to the vicinity of zero: see FIG. 5).

As a result, the effect of charging in a cold state can be enhanced when the hybrid vehicle 10 restarts from the point G. Further, warming up of the engine 12 is promoted due to charging in a cold state, so that the cold section can be shortened. As described above, the effect of charging in a cold state is enhanced, and the cold section is shortened, which lead to fuel saving (improvement of fuel efficiency).

It is necessary to accurately predict the point G (destination) in order for the target charge rate (target SOC) to be reduced to the special target charge rate when the hybrid vehicle 10 restarts from the point G. The prediction can be performed, for example, by a prediction model based on Bayesian statistics.

Specifically, the position detection unit 42 acquires the current position (position information) of the hybrid vehicle 10 from the sensor unit 26 and the car navigation system 28. At this time, the analysis unit 30 acquires the vehicle speed, and when the hybrid vehicle 10 stops and starts, the analysis unit 30 also acquires the time when the hybrid vehicle 10 stops and starts. Then, the analysis unit 30 updates the travel history information (secondary information) stored in the history information storage unit 34.

As a result, the travel history information (secondary information) of the hybrid vehicle 10 is accumulated in the history information storage unit 34. When the analysis unit 30 detects parking of the hybrid vehicle 10, traveling frequency from a previous parking point to a current parking point is updated. As a result, the travel route information is updated. Further, information sensed as the primary information is recorded in the recording unit 36.

In addition, the analysis unit 30 predicts subsequent parking points based on prediction information on a travel route that is most likely to be selected based on the current position and the travel history information of the hybrid vehicle 10. That is, the analysis unit 30 predicts one or more parking points as candidate sites for destinations. Further, the analysis unit 30 calculates expected arrival time when the hybrid vehicle 10 is expected to arrive at each candidate site. The expected arrival time can be calculated by an algorithm similar to the algorithm used by the car navigation system 28 or the like.

Figure 4:
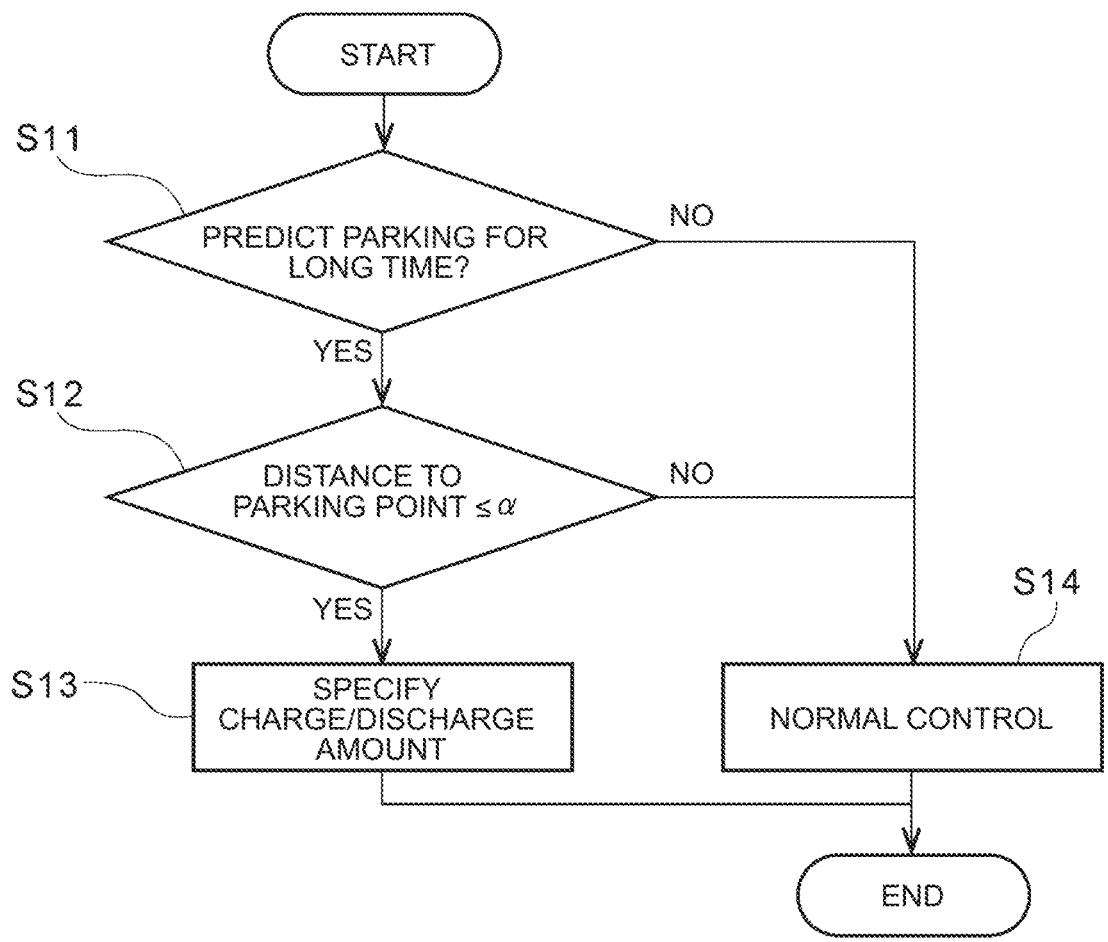
FIG. 4 is a flowchart showing a control process according to a first embodiment.

Then, the analysis unit 30 predicts parking time in each candidate site, and as shown in FIG. 4, predicts, as a destination, a candidate site that is expected to be parked for a long time (step S11). The analysis unit 30 may correct the parking time according to an estimated temperature at expected arrival time when the hybrid vehicle 10 is expected to arrive at each candidate site, the estimated temperature being transmitted from the management center 50. In the weather information storage unit 52 of the management center 50, the estimated temperature of each location is stored as weather information.

The prediction unit 32 predicts the travel route based on a predicted destination and transit point, and sets the point P2 at a point preceding the destination by a predetermined distance α. When the predicted destination and transit point are changed before the hybrid vehicle 10 reaches the destination, the prediction unit 32 resets the point P2 as appropriate.

As described above, the hybrid vehicle 10 can predict the point G (destination) while traveling, and can set the point P2 at a point preceding the point G (destination) by a predetermined distance α. When the point P2 is set, the position detection unit 42 periodically detects the current position of the hybrid vehicle 10, and the analysis unit 30 determines whether the hybrid vehicle 10 has reached the point P2 (step S12).

Then, when the analysis unit 30 determines that the hybrid vehicle 10 has actually reached the point P2 (when the hybrid vehicle 10 satisfies an approach condition that the hybrid vehicle 10 approaches the parking point and satisfies a condition that a distance to the parking point is α or less in FIG. 4), the target setting unit 38 reduces the target charge rate to the special target charge rate lower than the basic target charge rate CM.

As a result, after the point P2, the charge/discharge amount of the battery 16 is controlled to a discharge side by the battery control unit 18 such that the electric energy of the battery 16 is actively consumed. In the embodiment, however, the discharge amount of the charge/discharge amount of the battery 16 is forcibly specified such that the charge/discharge amount of the battery 16 can be efficiently controlled (step S13).

Figure 5:
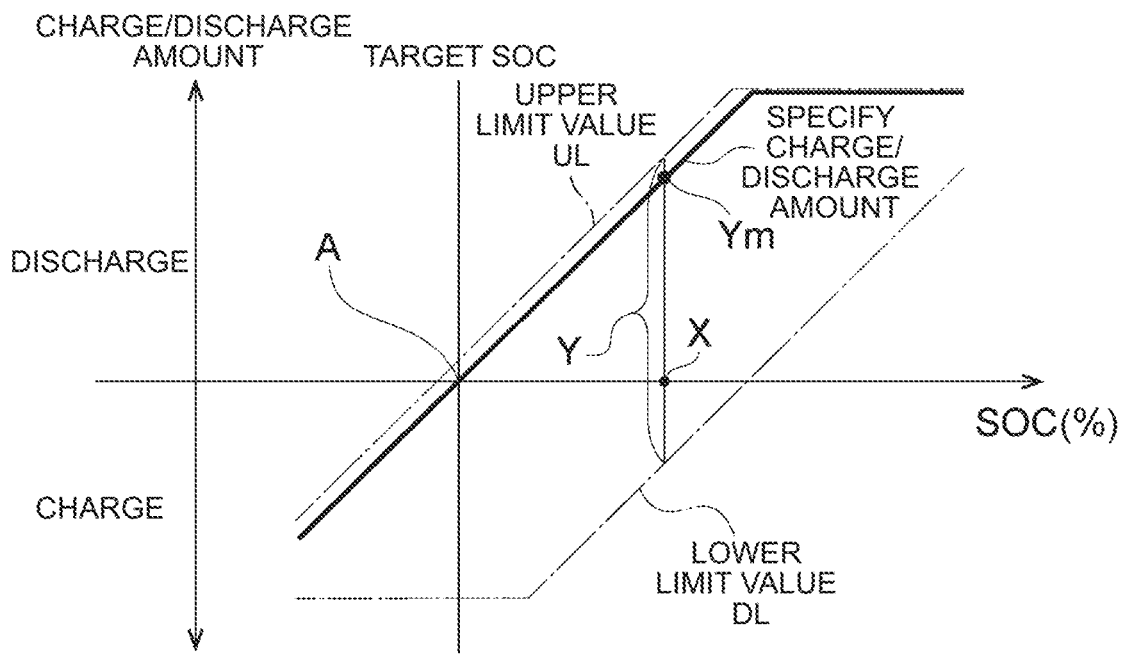
FIG. 5 is a graph showing a charge/discharge amount of a battery with respect to the SOC according to the first embodiment.

For example, FIG. 5 illustrates a case in which the target setting unit 38 sets the target charge rate to any charge rate (indicated by the point X). That is, in this case, the battery control unit 18 controls the battery 16 such that the charge/discharge amount of the battery 16 corresponding to the charge rate indicated by the point X (a part of the portion indicated by a range Y) is larger on the discharge side than an upper limit value Ym of the charge/discharge amount of the battery 16 corresponding to the charge rate indicated by the point X in a normal state (when the target setting unit 38 does not set the target charge rate to any charge rate).

More specifically, in the normal state, as shown by the solid line in FIG. 5, the battery 16 is controlled to the charge/discharge amount of the battery 16 corresponding to the battery charge rate indicated by the point X. The battery control unit 18 controls the battery 16 such that the upper limit value of the charge/discharge amount of the battery 16 on the discharge side is set to an upper limit value UL of the charge/discharge amount of the battery 16 on the discharge side (the portion indicated by the range Y) when the target setting unit 38 sets the target charge rate to any charge rate (indicated by the point X).

With such control, the electric energy of the battery 16 can be consumed more actively by the time the hybrid vehicle 10 reaches the point G (destination), and when the hybrid vehicle 10 reaches the point G, the actual charge rate (SOC) can be efficiently and surely reduced to the vicinity of a lower limit value CD shown in FIG. 2 (the special target charge rate shown by the point A in FIG. 5).

The "upper limit value UL" in the embodiment includes a value that is equal to or less than the upper limit value UL and close to the upper limit value UL. Further, in order to set the charge/discharge amount of the battery 16 corresponding to the special target charge rate indicated by the point A to the upper limit value UL, after the point P2, the electric energy of the battery 16 is not only preferentially used as the driving force of the traction motor 14 but used to charge an auxiliary battery (not shown), for example.

Further, loop processing by the vehicle control device 20 shown in FIG. 4 is repeatedly executed at regular intervals, for example, every few seconds. Further, when parking for a long time is not expected and when the hybrid vehicle 10 does not reach the point P2, the control in the normal state is performed (step S14). That is, as shown in FIG. 5, the charge/discharge amount of the battery 16 is controlled to be within a range between the upper limit value UL and the lower limit value DL at any charge rate indicated by, for example, the point X.

Further, the upper limit value UL and the lower limit value DL of the charge/discharge amount of the battery 16 in the normal state are determined based on a charge capacity of the battery 16, a vehicle speed of the hybrid vehicle 10 (the number of rotations of a propeller shaft that transmits power generated by the engine 12 to wheels), and driving characteristics (such as accelerator operation amount, etc. of a driver, hereinafter referred to as a "request from a driver").

That is, in the normal state, the charge/discharge amount is controlled based on not only the charge capacity of the battery 16 but also the traveling state (vehicle speed) and the driving characteristics (request from the driver) of the hybrid vehicle 10. Therefore, even when the target setting unit 38 sets the target charge rate to the special target charge rate, the electric energy of the battery 16 can be consumed without deteriorating the battery 16.

Figure 6:
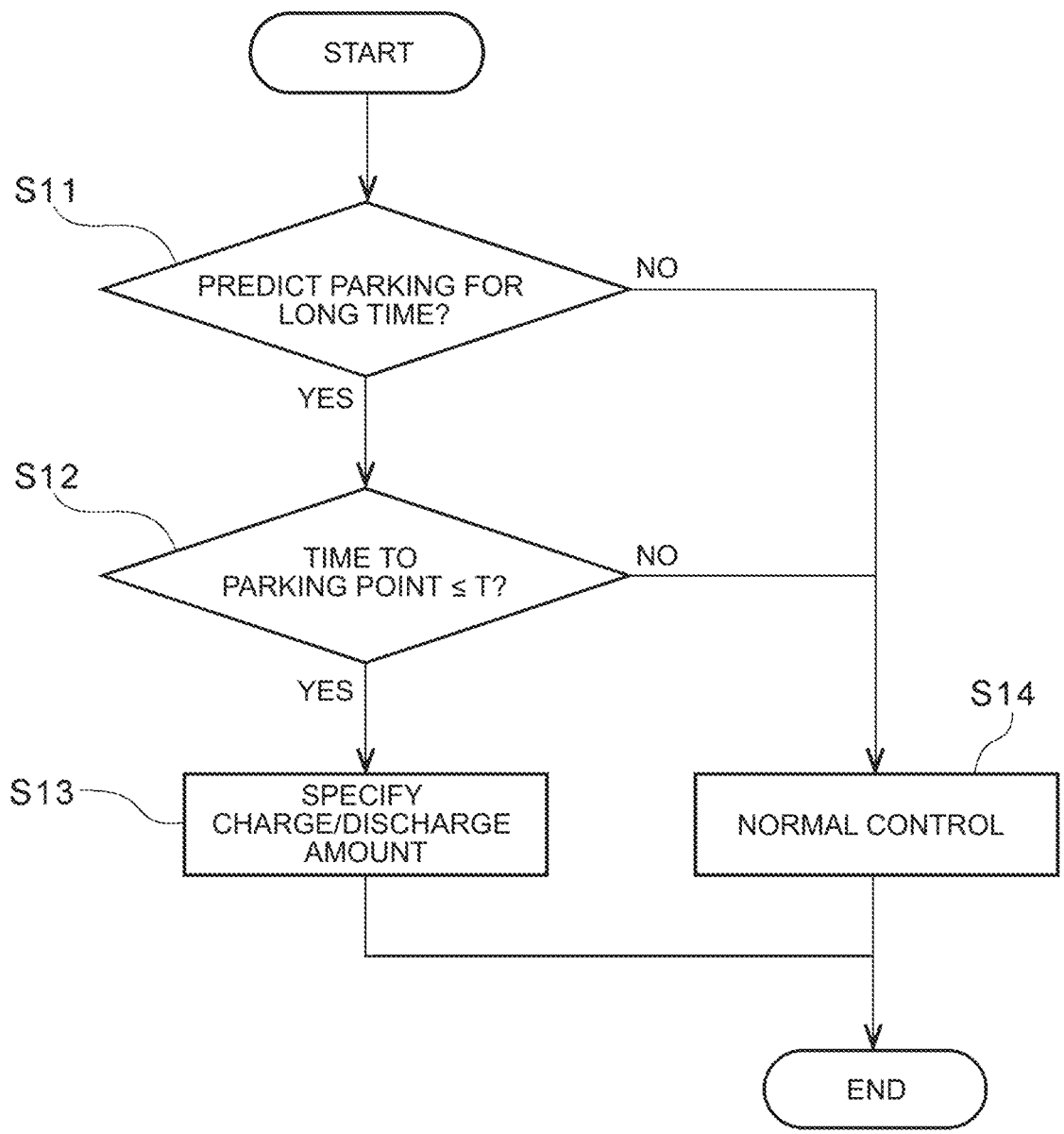
FIG. 6 is a flowchart showing a control process according to a modification of the first embodiment.

Further, instead of setting the point P2 at the point preceding the destination by the predetermined distance α, the point P2 may be set at a point where the hybrid vehicle 10 is located preceding the expected arrival time to the destination by predetermined time T (time T may be used instead of the distance α for the approach condition). In this case, as shown in FIG. 6, in step S12, the current time is periodically detected, and it is determined whether time taken to reach the parking point is equal to or less than the predetermined time T. Further, the approach condition may be determined not only based on the distance α or the time T but also based on the driving characteristics (request from the driver) and the like.

Further, since the communication information with the management center 50 is only the weather information, the charge/discharge amount of the battery 16 can be controlled in real time, and a risk of control failure due to communication interruption can be reduced. Further, when the communication information with the management center 50 includes information on other vehicles, congestion information and the like can be reflected to the charge/discharge control, so that the battery charge rate can reach the target charge rate accurately.

Second Embodiment

Figure 7:
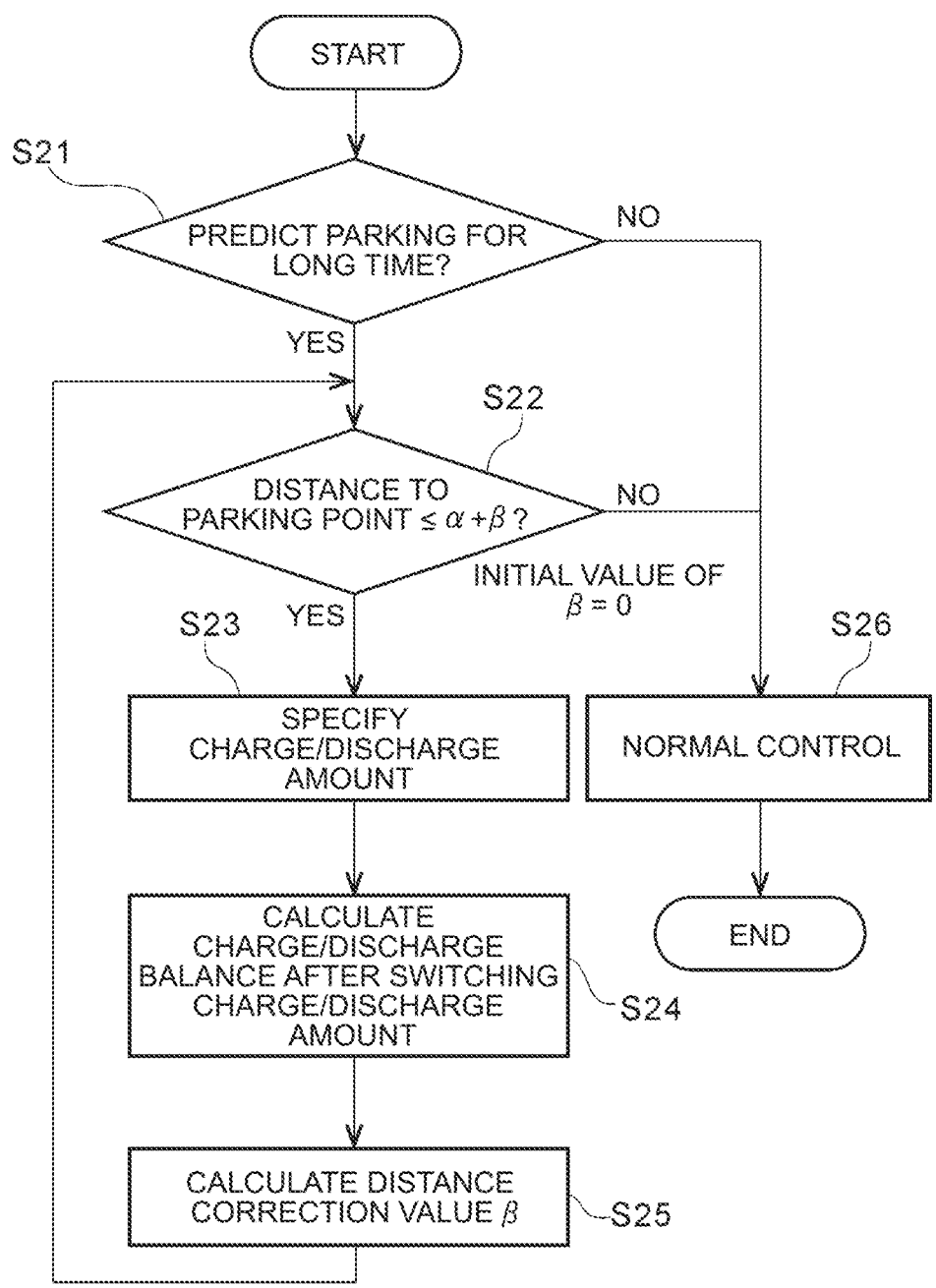
FIG. 7 is a flowchart showing a control process according to a second embodiment.

Next, a second embodiment will be described. In the second embodiment, as shown in FIG. 7, the condition of approaching the parking point includes a distance correction value β set based on data when the hybrid vehicle 10 was parked at the parking point. Specifically, first, as in the first embodiment, the analysis unit 30 predicts parking time at each candidate site, and predicts, as a destination, a candidate site that is expected to be parked for a long time (step S21).

Then, the prediction unit 32 predicts the travel route based on a transition point and the destination, and sets the point P2 at a point preceding the destination by a predetermined distance α. When the point P2 is set, the position detection unit 42 periodically detects the current position of the hybrid vehicle 10, and the analysis unit 30 determines whether the hybrid vehicle 10 has reached the point P2 (step S22).

When the analysis unit 30 determines that the hybrid vehicle 10 has actually reached the point P2, the target setting unit 38 reduces the target charge rate to the special target charge rate lower than the basic target charge rate CM. As a result, after the point P2, the charge/discharge amount of the battery 16 is controlled by the battery control unit 18 such that the electric energy of the battery 16 is consumed more actively. That is, the charge/discharge amount of the battery 16 is forcibly specified (step S23).

Here, for example, when downward slopes continue around the destination, when the engine 12 continues to be driven due to a request for cooling or heating around the destination, when a request load from a driver is high (a vehicle speed that continuously requires the driving force of the engine 12, sudden acceleration) and the like, the SOC of the battery 16 is hardly reduced. On the other hand, when upward slopes continue around the destination, the vehicle frequently stops due to traffic congestion around the destination, a request load from a driver is low (a vehicle speed and acceleration that allow the vehicle to continuously travel with a driving force generated by electric energy) and the like, the SOC of the battery 16 is extremely reduced.

Therefore, in such a case, an average value of an actual charge/discharge balance is calculated from the actual charge/discharge balance after switching the charge/discharge amount (setting the charge/discharge amount to the upper limit value UL), the charge/discharge balance being recorded for each destination where the hybrid vehicle 10 was parked (step S24). Then, the distance correction value β is calculated based on a difference between a target balance set in advance based on the amount of charge to be reduced before the hybrid vehicle 10 reaches the destination and the actual balance derived from the average value (step S25).

After calculating the distance correction value β as described above, the routine returns to step S22 and the calculated distance correction value β is reflected to the distance c that is used as a reference for issuing an instruction for switching the charge/discharge amount. That is, in step S22, it is determined whether the distance to the parking point is equal to or less than a value obtained by adding the distance c and the distance correction value β. When the SOC is hardly reduced, the charge/discharge amount may be switched at an early timing. When the SOC is extremely reduced, the charge/discharge amount may be switched at a late timing.

According to the second embodiment, when the hybrid vehicle 10 reaches the parking point, the charge rate of the battery 16 can be reduced to the target charge rate more efficiently and surely than when the distance correction value β is not included in the approach condition. Further, when parking for a long time is not expected and when the hybrid vehicle 10 does not reach the point P2, as in the first embodiment, the control in the normal state is performed (step S26).

Figure 8:
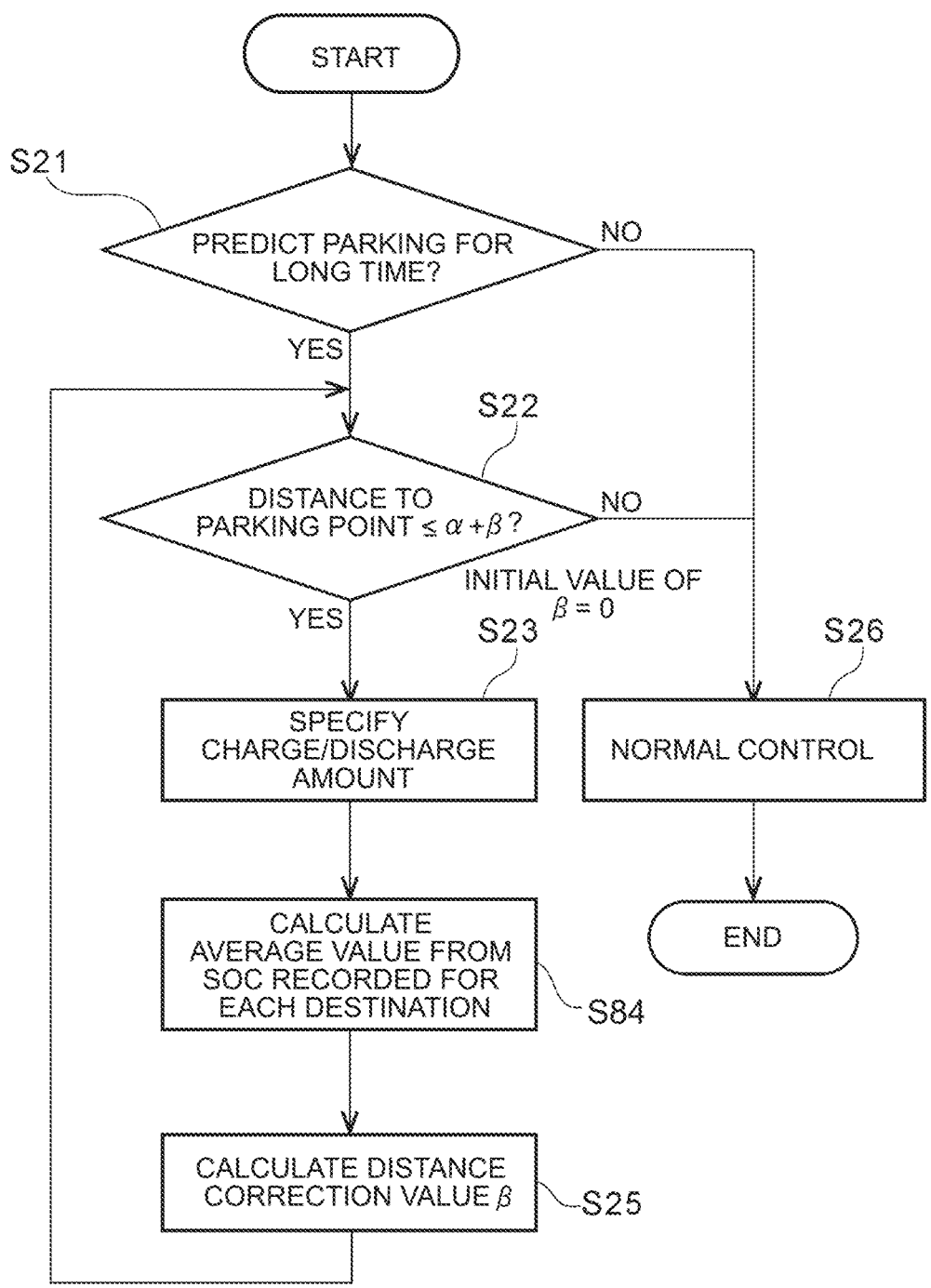
FIG. 8 is a flowchart showing a control process according to a modification of the second embodiment.

Further, as shown in FIG. 8, in step S84, the average value may be calculated from the SOC when the hybrid vehicle 10 reached the destination, the SOC being recorded for each destination where the hybrid vehicle 10 was parked, instead of calculating the average value from the charge/discharge balance after switching the charge/discharge amount recorded for each destination where the hybrid vehicle 10 was parked. Then, in step S25, the distance correction value β may be calculated based on the difference between the target SOC (special target charge rate) and the actual SOC derived from the average value.

Third Embodiment

Figure 9:
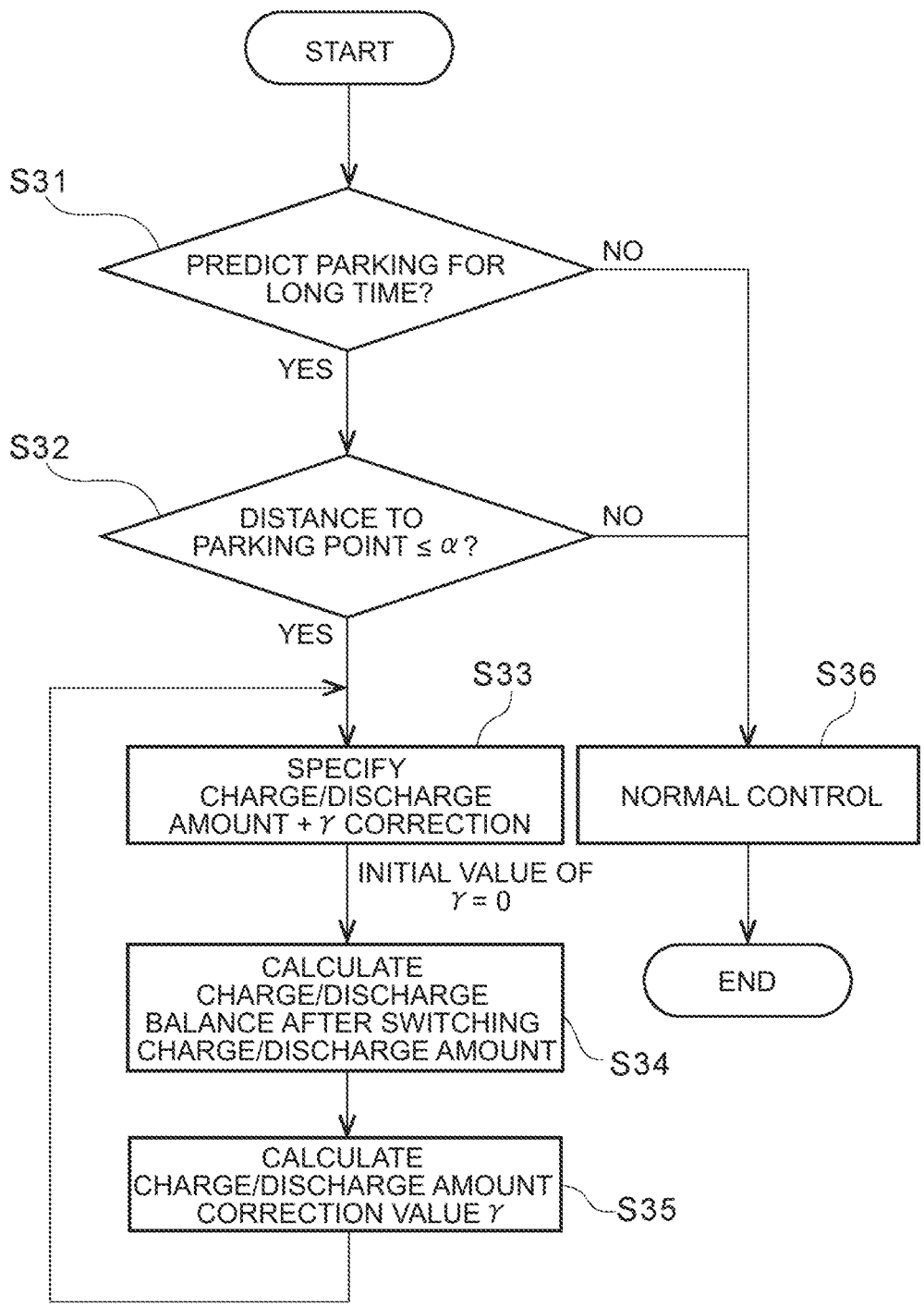
FIG. 9 is a flowchart showing a control process according to a third embodiment.

Next, a third embodiment will be described. In the third embodiment, as shown in FIG. 9, a charge/discharge amount correction value γ set based on the data when the hybrid vehicle 10 was parked at the parking point is added to the charge/discharge amount that is set to the upper limit value UL. Specifically, first, as in the first embodiment, the analysis unit 30 predicts parking time at each candidate site, and predicts, as a destination, a candidate site that is expected to be parked for a long time (step S31).

Then, the prediction unit 32 predicts a travel route based on a transition point and the destination, and sets the point P2 at a point preceding the destination by a predetermined distance α. When the point P2 is set, the position detection unit 42 periodically detects the current position of the hybrid vehicle 10, and the analysis unit 30 determines whether the hybrid vehicle 10 has reached the point P2 (step S32).

When the analysis unit 30 determines that the hybrid vehicle 10 has actually reached the point P2, the target setting unit 38 reduces the target charge rate to the special target charge rate lower than the basic target charge rate CM. As a result, after the point P2, the charge/discharge amount of the battery 16 is controlled by the battery control unit 18 such that the electric energy of the battery 16 is consumed more actively. That is, the charge/discharge amount of the battery 16 is forcibly specified (step S33).

Here, as in the second embodiment, an average value is calculated from the actual charge/discharge balance after switching the charge/discharge amount (setting the charge/discharge amount to the upper limit value UL), the charge/discharge balance being recorded for each destination where the hybrid vehicle 10 was parked (step S34). Then, the charge/discharge amount correction value γ is calculated based on a difference between a target balance set in advance based on the amount of charge to be reduced before the hybrid vehicle 10 reaches the destination and the actual balance derived from the average value (step S35).

Figure 10:
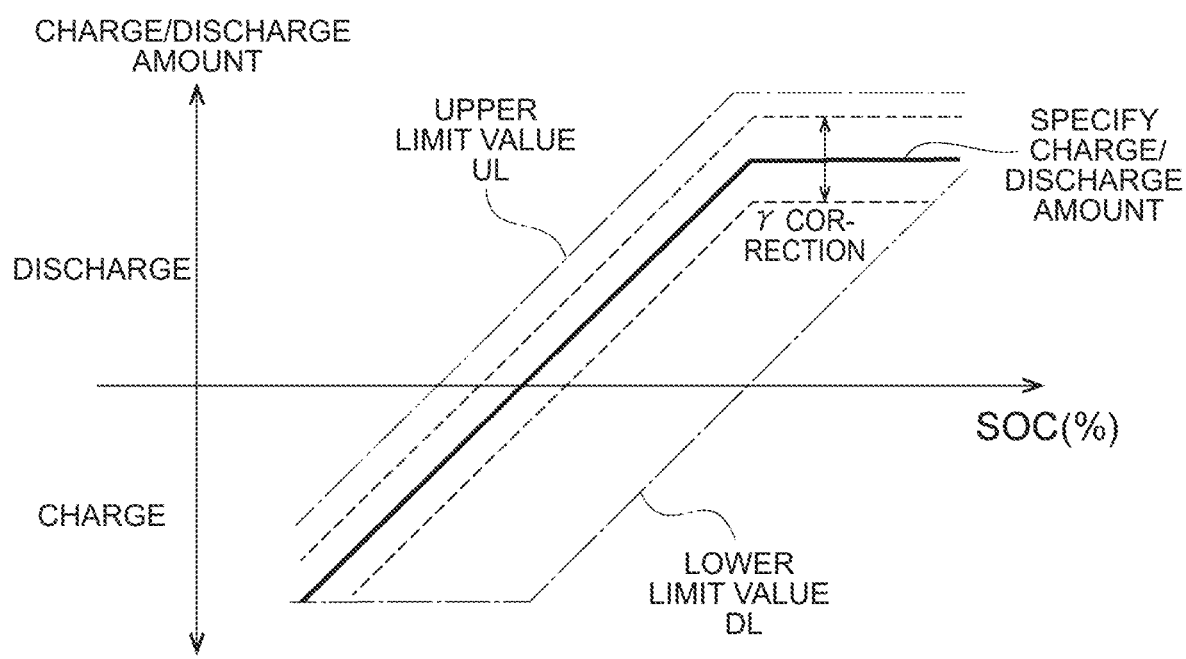
FIG. 10 is a graph showing a charge/discharge amount of a battery with respect to the SOC according to the third embodiment.

After calculating the charge/discharge amount correction value γ as described above, the routine returns to step S33 and the charge/discharge amount correction value γ is reflected to the switched charge/discharge amount (the charge/discharge amount that is set to the upper limit value UL) (the charge/discharge amount correction value γ is added to the switched charge/discharge amount). When the SOC is hardly reduced, the discharge amount is increased, and when the SOC is extremely reduced, the discharge amount is reduced. That is, as shown in FIG. 10, the charge/discharge amount is adjusted to the vicinity of the upper limit value UL of the charge/discharge amount.

According to the third embodiment, when the hybrid vehicle 10 reaches the parking point, the charge rate of the battery 16 can be reduced to the target charge rate more efficiently and surely than when the charge/discharge amount correction value γ is not added to the charge/discharge amount that is set to the upper limit value UL. Further, when parking for a long time is not expected and when the hybrid vehicle 10 does not reach the point P2, as in the first embodiment, the control in the normal state is performed (step S36).

Figure 11:
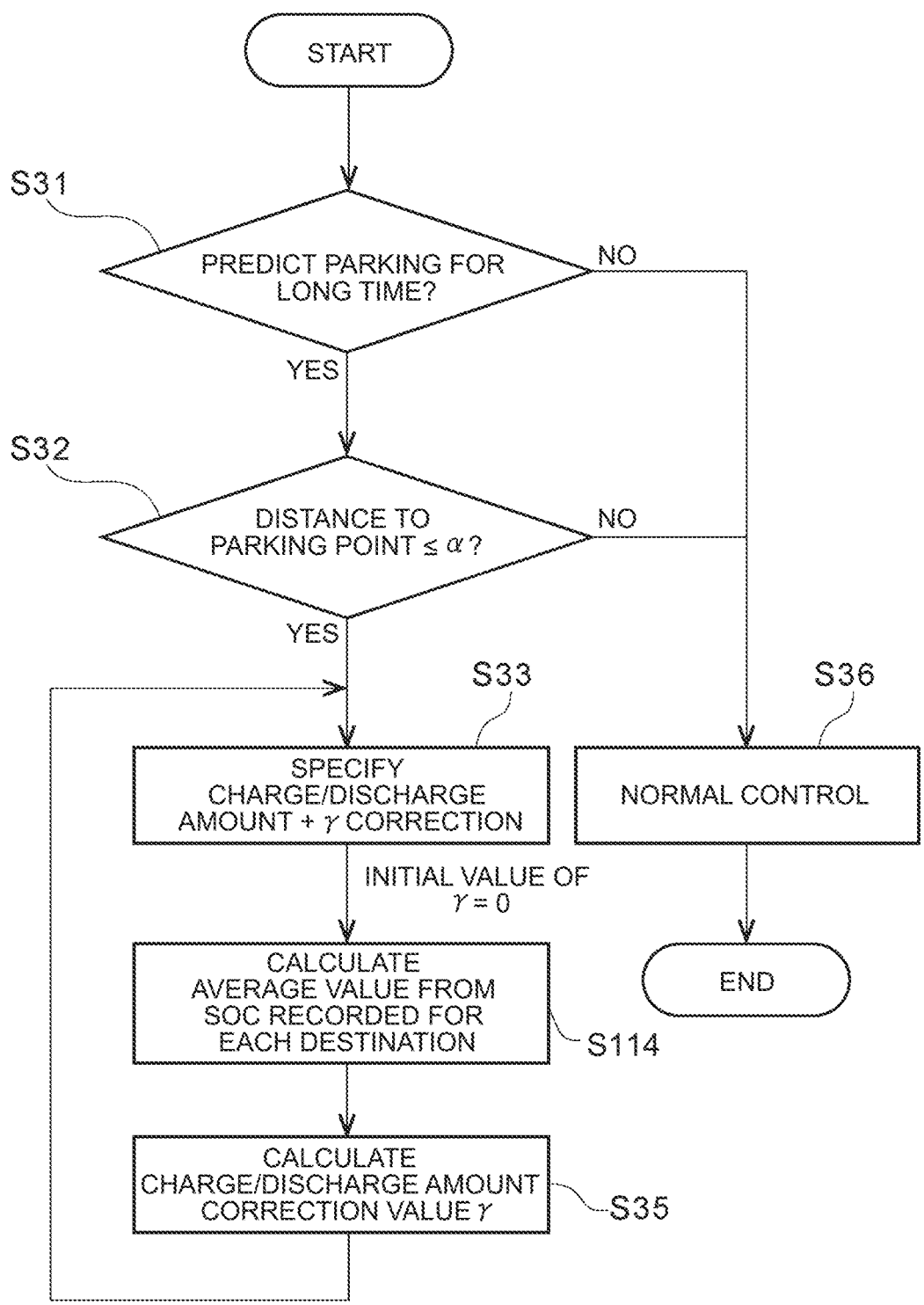
FIG. 11 is a flowchart showing a control process according to a modification of the third embodiment.

Further, as shown in FIG. 11, in step S114, the average value may be calculated from the SOC when the hybrid vehicle 10 reached the destination, the SOC being recorded for each destination where the hybrid vehicle 10 was parked, instead of calculating the average value from the charge/discharge balance after switching the charge/discharge amount recorded for each destination where the hybrid vehicle 10 was parked. Then, in step S35, the charge/discharge amount correction value γ may be calculated based on the difference between the target SOC (special target charge rate) and the actual SOC derived from the average value.

The vehicle control device 20, the vehicle control system 40, and the hybrid vehicle 10 according to the embodiment have been described above with reference to the drawings, but the vehicle control device 20, the vehicle control system 40, and the hybrid vehicle 10 according to the embodiment are not limited to the illustrated embodiments and design thereof can be changed as appropriate within the scope of the present disclosure. For example, the Global Positioning System (GPS) function may be used instead of the car navigation system 28.

Further, an analysis function, which has been included in the vehicle control device 20, may be built in the management center 50 in the vehicle control system 40. That is, the management center 50 may include the analysis unit 30 and the history information storage unit 34. Accordingly, the specifications of the arithmetic processing device on the hybrid vehicle 10 side can be lowered.

Further, when external information is used in the management center 50, there are following two forms in which all the data are transmitted to the hybrid vehicle 10 side and then the hybrid vehicle 10 side makes a determination, and the management center 50 makes a determination and then only the command is transmitted to the hybrid vehicle 10 side. The latter form allows the arithmetic load on the hybrid vehicle 10 side to be reduced.

What is claimed is:

1. A vehicle control device configured to be mounted on a hybrid vehicle, the hybrid vehicle comprising an engine and a battery chargeable with electric power generated by driving the engine, the vehicle control device comprising:
   a prediction unit configured to acquire position information of a parking point where parking time of the hybrid vehicle on a travel route is predicted to exceed a predetermined threshold value;
   a target setting unit configured to set a target charge rate of the battery and change the target charge rate to a second charge rate that is lower than a first charge rate in a normal state when the hybrid vehicle satisfies an approach condition that the hybrid vehicle approaches the parking point; and
   a battery control unit,
   wherein, in response to the target setting unit setting the target charge rate to the second charge rate,
   at a first step, the battery control unit is configured to control a charge and discharge amount of the battery such that a charge and discharge amount of the battery corresponding to the second charge rate when the target setting unit sets the target charge rate to the second charge rate is forcibly set to an upper limit value, on a discharge side, of a charge and discharge amount of the battery corresponding to the second charge rate in the normal state, at a second step, after forcibly setting the charge and discharge amount of the battery to the upper limit value, an average value is calculated from past data, wherein the past data include an actual charge/ discharge balance after forcibly setting the charge and discharge amount of the battery to the upper limit value, the actual charge/discharge balance being recorded for each destination where the hybrid vehicle was parked, at a third step, a charge and discharge amount correction value is calculated based on a difference between a target balance set in advance based on an amount of charge to be reduced before the hybrid vehicle reaches the destination, and an actual balance derived from the average value, and after calculating the charge and discharge amount correction value, it is returned to the first step where the charge and discharge amount of the battery to be controlled by the battery control unit is adjusted by adding the charge and discharge amount correction value thereto.

2. The vehicle control device according to claim 1, wherein the upper limit value and a lower limit value of the charge and discharge amount of the battery in the normal state are determined based on a charge capacity of the battery, a vehicle speed, and a driving characteristic.

3. The vehicle control device according to claim 1, wherein the approach condition includes a distance correction value set based on past data.

4. A vehicle control system, comprising:
the vehicle control device according to claim 1, the vehicle control device being mounted on a hybrid vehicle; and
an acquisition unit configured to be able to communicate with the vehicle control device and to acquire external information at the parking point.

5. A hybrid vehicle, comprising:
an engine;
a battery chargeable with electric power generated by driving the engine;
a traction motor configured to be driven by the electric power charged in the battery; and
the vehicle control device according to claim 1, wherein the vehicle control device is configured to cause the hybrid vehicle to travel by switching between driving by the engine and driving by the traction motor.

6. The vehicle control device according to claim 1, wherein, when the charge and discharge amount of the battery corresponding to the second charge rate when the target setting unit sets the target charge rate to the second charge rate is forcibly set to the upper limit value, the vehicle control device is configured to use electric energy of the battery as a driving force of a traction motor of the hybrid vehicle and also to charge an auxiliary battery of the hybrid vehicle.

7. A vehicle control device configured to be mounted on a hybrid vehicle, the hybrid vehicle comprising an engine and a battery chargeable with electric power generated by driving the engine, the vehicle control device comprising:

a prediction unit configured to acquire position information of a parking point where parking time of the hybrid vehicle on a travel route is predicted to exceed a predetermined threshold value;

a target setting unit configured to set a target charge rate of the battery and change the target charge rate to a second charge rate that is lower than a first charge rate in a normal state when the hybrid vehicle satisfies an approach condition that the hybrid vehicle approaches the parking point; and a battery control unit,
wherein, in response to the target setting unit setting the target charge rate to the second charge rate, at a first step, the battery control unit is configured to control a charge and discharge amount of the battery such that a charge and discharge amount of the battery corresponding to the second charge rate when the target setting unit sets the target charge rate to the second charge rate is forcibly set to an upper limit value, on a discharge side, of a charge and discharge amount of the battery corresponding to the second charge rate in the normal state, at a second step, after forcibly setting the charge and discharge amount of the battery to the upper limit value, an average value is calculated from past data, wherein the past data include a state of charge (SOC) when the hybrid vehicle reached each destination where the hybrid vehicle was parked, at a third step, a charge and discharge amount correction value is calculated based on a difference between a target SOC corresponding to the second charge rate, and an actual SOC derived from the average value, and after calculating the charge and discharge amount correction value, it is returned to the first step where the charge and discharge amount of the battery to be controlled by the battery control unit is adjusted by adding the charge and discharge amount correction value thereto.

8. The vehicle control device according to claim 7, wherein the upper limit value and a lower limit value of the charge and discharge amount of the battery in the normal state are determined based on a charge capacity of the battery, a vehicle speed, and a driving characteristic.

9. The vehicle control device according to claim 7, wherein the approach condition includes a distance correction value set based on past data.

10. A vehicle control system, comprising:
the vehicle control device according to claim 7, the vehicle control device being mounted on a hybrid vehicle; and
an acquisition unit configured to be able to communicate with the vehicle control device and to acquire external information at the parking point.

11. A hybrid vehicle, comprising:
an engine;
a battery chargeable with electric power generated by driving the engine;
a traction motor configured to be driven by the electric power charged in the battery; and
the vehicle control device according to claim 7, wherein the vehicle control device is configured to cause the hybrid vehicle to travel by switching between driving by the engine and driving by the traction motor.

12. The vehicle control device according to claim 7, wherein, when the charge and discharge amount of the battery corresponding to the second charge rate when the target setting unit sets the target charge rate to the second charge rate is forcibly set to the upper limit value, the vehicle control device is configured to use electric energy of the battery as a driving force of a traction motor of the hybrid vehicle and also to charge an auxiliary battery of the hybrid vehicle.

* * * * *